United States Patent
Goto

(10) Patent No.: US 10,541,537 B2
(45) Date of Patent: Jan. 21, 2020

(54) POWER SUPPLY APPARATUS, POWER SUPPLY SYSTEM, AND POWER SUPPLY METHOD

(71) Applicant: KYOCERA CORPORATION, Kyoto-Shi, Kyoto (JP)

(72) Inventor: Ryo Goto, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 339 days.

(21) Appl. No.: 15/503,195

(22) PCT Filed: Aug. 11, 2015

(86) PCT No.: PCT/JP2015/004030
§ 371 (c)(1),
(2) Date: Feb. 10, 2017

(87) PCT Pub. No.: WO2016/024406
PCT Pub. Date: Feb. 18, 2016

(65) Prior Publication Data
US 2017/0237265 A1    Aug. 17, 2017

(30) Foreign Application Priority Data
Aug. 11, 2014  (JP) ................... 2014-163888

(51) Int. Cl.
*H02J 3/46*    (2006.01)
(52) U.S. Cl.
CPC .................... *H02J 3/46* (2013.01)

(58) Field of Classification Search
None
See application file for complete search history.

(56) References Cited

U.S. PATENT DOCUMENTS

| 2004/0032127 | A1  | 2/2004 | Tokiwa et al. |
| 2011/0163603 | A1* | 7/2011 | Chou ............ H02J 3/381 307/66 |

(Continued)

FOREIGN PATENT DOCUMENTS

| EP | 3 168 952 A1 | 5/2017 |
| JP | 2002-247765 A | 8/2002 |

(Continued)

OTHER PUBLICATIONS

International Search Report dated Nov. 2, 2015 issued by the Japan Patent Office in counterpart International Application No. PCT/JP2015/004030.

(Continued)

*Primary Examiner* — Jared Fureman
*Assistant Examiner* — Joel Barnett
(74) *Attorney, Agent, or Firm* — Procopio Cory Hargreaves and Savitch LLP

(57) ABSTRACT

A power supply apparatus links to a grid, converts DC power from a distributed power source to AC power, and includes a controller that controls input voltage of the DC power in accordance with current flowing between the power supply apparatus and the grid. Based on communication with another power supply apparatus connected to the power supply apparatus, the controller also sets a standard value of controlling the input voltage.

15 Claims, 6 Drawing Sheets

(56) References Cited

U.S. PATENT DOCUMENTS

| | | | | |
|---|---|---|---|---|
| 2012/0319490 A1* | 12/2012 | Adest | ............... | G01S 3/7861 |
| | | | | 307/77 |
| 2014/0319920 A1* | 10/2014 | Kuboyama | ............ | H02J 3/385 |
| | | | | 307/82 |
| 2014/0327315 A1* | 11/2014 | Baba | ................ | H02J 3/46 |
| | | | | 307/81 |

FOREIGN PATENT DOCUMENTS

| | | | |
|---|---|---|---|
| JP | 2004-266940 A | 9/2004 | |
| JP | 2006-333563 A | 12/2006 | |
| JP | 2014-90535 A | 5/2014 | |
| WO | 2012/090709 A1 | 7/2012 | |
| WO | 2013/073126 A1 | 5/2013 | |
| WO | 2013/088798 A1 | 6/2013 | |

OTHER PUBLICATIONS

Written Opinion of the International Search Authority dated Nov. 2, 2015 issued by the Japan Patent Office in counterpart International Application No. PCT/JP2015/004030.

Office Action dated Aug. 22, 2017 issued in counterpart Japanese Application No. 2016-542507.

Extended European Search Report dated Jan. 23, 2018, issued by the European Patent Office in counterpart European Patent Application No. 15 832080.4.

* cited by examiner

POWER SUPPLY APPARATUS, POWER SUPPLY SYSTEM, AND POWER SUPPLY METHOD

CROSS-REFERENCE TO RELATED APPLICATION

This application claims priority to and the benefit of Japanese Patent Application No. 2014-163888 filed Aug. 11, 2014, the entire contents of which are incorporated herein by reference.

TECHNICAL FIELD

This disclosure relates to a power supply apparatus, a power supply system, and a power supply method. In greater detail, this disclosure relates to a power supply apparatus that supplies power generated by a distributed power source such as a fuel cell, a power supply system in which a plurality of such power supply apparatuses are connected, and a power supply method in such a system.

BACKGROUND

In recent years, research has been done on a system that connects a plurality of distributed power sources, such as solar cells and fuel cells, as power generation apparatuses, and supplies power generated by the power generation apparatuses. The power generation apparatuses used as these distributed power sources for example include fuel cells such as a Polymer Electrolyte Fuel Cell (PEFC) and a Solid Oxide Fuel Cell (SOFC). It has been proposed to adopt a plurality of such distributed power sources and control the power consumption of apparatuses constituting a load in accordance with the power that can be output by the distributed power sources.

Currently, power generated using a distributed power source such as the above-described fuel cell cannot be sold to the grid. Therefore, in current power supply systems, upon detecting reverse power flow to the grid of power generated by a distributed power source such as a fuel cell, control is performed to reduce or suspend the supply. Accordingly, in a system in which a plurality of these distributed power sources are connected and operate, the output of each of the plurality of distributed power sources is controlled upon detection of reverse power flow to adjust the power supplied by the system as a whole so that reverse power flow does not occur (for example, see JP 2002-247765 A (PTL 1)).

CITATION LIST

Patent Literature

PTL 1: JP 2002-247765 A

SUMMARY

PTL 1 proposes continuously communicating by connecting a plurality of power supply apparatuses (power conditioners) and sharing information on detection of reverse power flow monitored by at least one of the power conditioners. With this approach, all of the conditioners suppress the supply of power in unison when power flows in reverse to the grid, leading to the risk of power becoming unstable.

Solution to Problem

A power supply apparatus according to one of the disclosed embodiments is a power supply apparatus configured to link to a grid and convert DC power from a distributed power source to AC power, the power supply apparatus including:
  a controller configured to control input voltage of the DC power in accordance with current flowing between the power supply apparatus and the grid;
  such that based on communication with another power supply apparatus connected to the power supply apparatus, the controller sets a standard value of controlling the input voltage.

A power supply system according to one of the disclosed embodiments includes:
  a plurality of distributed power sources respectively connected to a plurality of power supply apparatuses;
  a plurality of power supply apparatuses each configured to link to a grid and convert DC power from the distributed power source to AC power; and
  a current sensor configured to detect current flowing between the plurality of power supply apparatuses and the grid;
  such that at least one power supply apparatus among the plurality of power supply apparatuses controls input voltage of the DC power in accordance with current detected by the current sensor, and based on communication with another power supply apparatus connected to the at least one power supply apparatus, sets a standard value of controlling the input voltage.

A power supply method according to one of the disclosed embodiments is a power supply method in a power supply system,
  the power supply system comprising:
  a plurality of distributed power sources respectively connected to a plurality of power supply apparatuses; and
  a plurality of power supply apparatuses each configured to link to a grid and convert DC power from the distributed power source to AC power;
  the power supply method comprising steps performed by at least one power supply apparatus among the plurality of power supply apparatuses, the steps comprising:
  communicating with another power supply apparatus connected to the at least one power supply apparatus;
  detecting current flowing between the plurality of power supply apparatuses and the grid;
  controlling input voltage of the DC power in accordance with the current detected in the detecting step; and
  setting, based on communication in the communicating step, a standard value of controlling the input voltage.

DETAILED DESCRIPTION

The following describes an embodiment of this disclosure with reference to the drawings.

Figure 1:
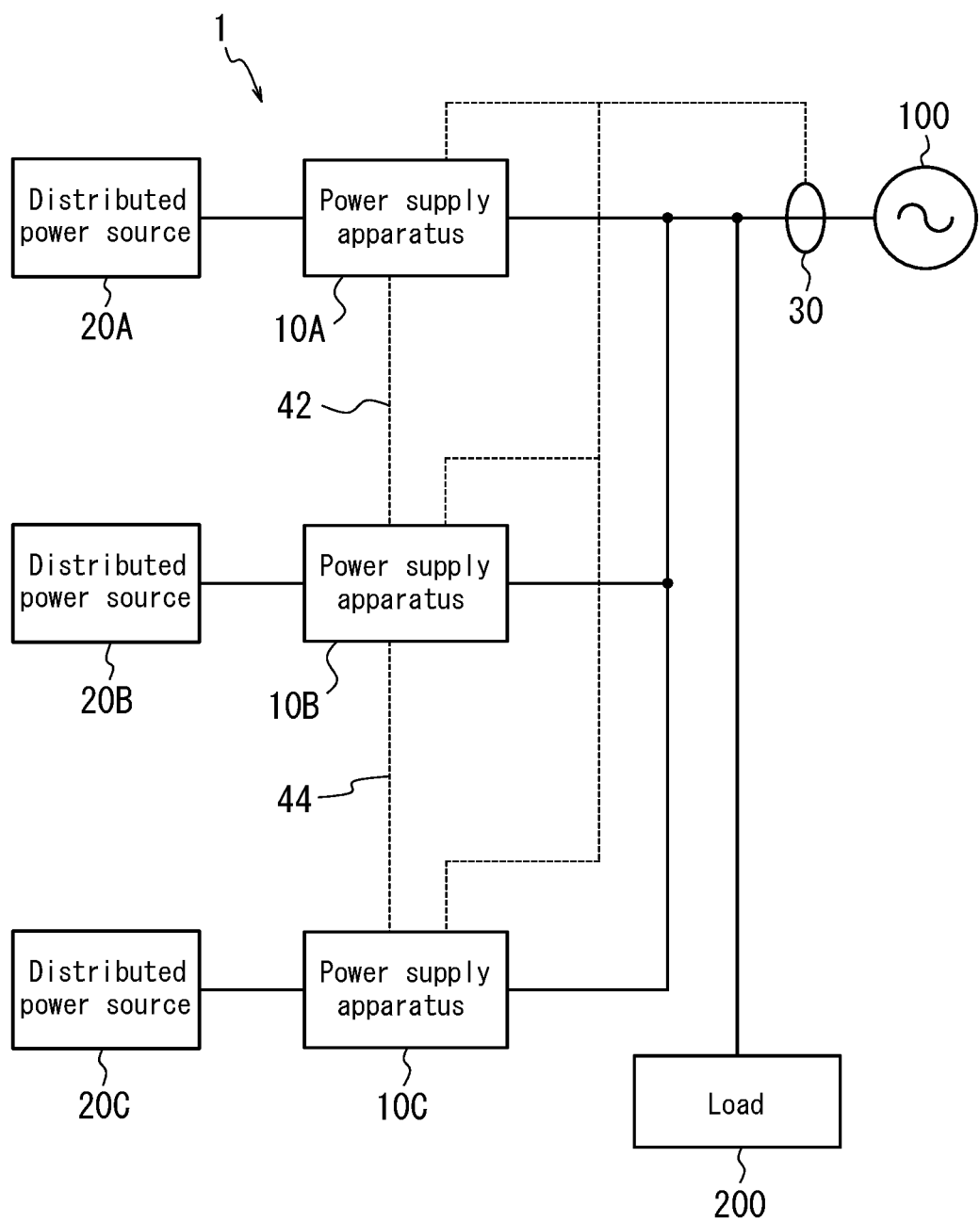
FIG. 1 is a functional block diagram schematically illustrating a power supply system according to one of the disclosed embodiments.

FIG. 1 is a functional block diagram schematically illustrating a power supply system that includes a plurality of power supply apparatuses according to this embodiment. In FIG. 1, solid lines indicate the path of power, whereas dashed lines indicate the path of control signals or signals that communicate a variety of information. Hereinafter, an explanation of elements and functional parts that are well known is simplified or omitted as appropriate.

As illustrated in FIG. 1, a power supply system 1 according to this embodiment is configured to include a power supply apparatus 10A, a distributed power source 20A, a power supply apparatus 10B, a distributed power source 20B, a power supply apparatus 10C, and a distributed power source 20C. FIG. 1 illustrates an example in which the power supply system 1 includes three power supply apparatuses 10A to 10C to which respective distributed power sources are connected. The power supply system 1 according to this embodiment, however, may be configured to include any number of power supply apparatuses structured like the power supply apparatuses 10A to 10C and any number of distributed power sources structured like the distributed power sources 20A to 20C.

As illustrated in FIG. 1, the power supply apparatus 10A is connected to the distributed power source 20A. The power supply apparatus 10A controls power output from the distributed power source 20A and supplies the power to a load 200. The power supply apparatus 10A is linked to a grid 100 and converts power supplied to the load 200 from DC to AC. A similar structure to that of the conventional power conditioner may be adopted as the structure for the power supply apparatus 10A to convert power. Further details on the control performed by the power supply apparatus 10A and the structure of the power supply apparatus 10A are provided below.

The distributed power source 20A is connected to the power supply apparatus 10A, is linked to the grid 100, and outputs power to supply to the load 200. The grid 100 may be a general, commercial power grid. The distributed power source 20A may, for example, be configured to include any of a variety of fuel cells or the like, such as a Polymer Electrolyte Fuel Cell (PEFC) or Solid Oxide Fuel Cell (SOFC). In particular, in this embodiment, the distributed power source 20A preferably cannot sell generated power to the grid, i.e. preferably generates power that cannot be subjected to reverse power flow.

The "power that cannot be subjected to reverse power flow" is power that is based on energy supplied from infrastructure, such as power generated by a fuel cell, and that is not allowed to be sold, for example as is the case currently in Japan. Accordingly, in this embodiment, the distributed power source 20A is preferably a different power generator from a power generator that can sell generated power to the grid, an example of which is a power generator provided with a solar cell that generates solar power. The following describes an example of the distributed power source 20A being an SOFC that generates DC power. The power generator according to this disclosure, however, is not limited to being an SOFC that generates DC power and is typically any of a variety of power generators provided with a fuel cell, or a distributed power source such as a storage cell that can charge and discharge power.

The distributed power source 20A constituted by a SOFC can generate power with a fuel cell power generation apparatus that causes gas, such as hydrogen and oxygen, supplied from the outside to undergo an electrochemical reaction. The distributed power source 20A can then output the generated power. In this embodiment, the distributed power source 20A may be capable of independent operation, whereby at startup time, the distributed power source 20A starts to operate upon receiving power from the grid 100 but then operates without receiving power from the grid 100 after starting up. In this embodiment, the distributed power source 20A may include other functional components as necessary, such as a reformer, in order to allow independent operation. In this embodiment, the distributed power source 20A can be configured by a typical, widely known fuel cell, and therefore a more detailed description of the fuel cell is omitted.

The power generated by the distributed power source 20A can be supplied through the power supply apparatus 10A to a variety of loads 200 that consume power. In an actual house or the like, the power supplied from the power supply apparatus 10A is supplied to the load 200 after passing through a distribution board or the like, but such a member is omitted in FIG. 1. The load 200 may be any of a variety of devices to which power is supplied from the power supply system 1, such as household appliances used by the user. In FIG. 1, the load 200 is illustrated as one member, but the load 200 is not limited to being one member and may be any number of a variety of devices.

As illustrated in FIG. 1, the power supply apparatus 10B is connected to the distributed power source 20B. The distributed power source 20B outputs power to the power supply apparatus 10B, and the power supply apparatus 10B controls power output from the distributed power source 20B and supplies the power to the load 200. The power supply apparatus 10C is connected to the distributed power source 20C. The distributed power source 20C outputs power to the power supply apparatus 10C, and the power supply apparatus 10C controls power output from the distributed power source 20C and supplies the power to the load 200.

The plurality of power supply apparatuses 10A, 10B, and 10C, and the distributed power sources 20A, 20B, and 20C illustrated in FIG. 1 can all have nearly the same configuration. These elements, however, are not limited to this configuration, and any of a variety of configurations may be adopted. In this embodiment, it suffices for the distributed power sources 20A, 20B, and 20C to link to the grid 100 and to be capable of outputting power supplied to the load 200. Also, in this embodiment, it suffices for the power supply apparatuses 10A, 10B, and 10C to control the power input thereto and to be capable of supplying the power to the load 200.

As illustrated in FIG. 1, in the power supply system 1, the power supplied from the power supply apparatus 10A is connected to the power supplied from the other power supply apparatuses 10B and 10C. In this way, in the power supply system 1, the power supply apparatuses 10A, 10B, and 10C are configured to receive input of power from the corresponding distributed power sources 20A, 20B and 20C and to connect power supplied from the power supply apparatuses 10A, 10B, and 10C. In FIG. 1, the DC power output by the distributed power sources 20A to 20C is connected after being converted to AC power, but the power supply system 1 according to this embodiment is not limited to this configuration. For example, the power may be connected while still in the form of DC power.

Furthermore, as illustrated in FIG. 1, a current sensor 30 is connected to the power supply apparatuses 10A to 10C in the power supply system 1. The current sensor 30 may, for example, be a Current Transformer (CT). Any element that can detect current, however, may be used. FIG. 1 illustrates a configuration in which an output signal from one current sensor 30 is supplied to the power supply apparatuses 10A to 10C, but the power supply apparatuses 10A to 10C may be configured each to have an individual current sensor.

This current sensor 30 detects the current flowing between the power supply apparatuses 10A to 10C and the grid 100. As a result, the power supply apparatuses 10A to 10C can determine whether power supplied by the power supply system 1 is flowing in reverse to the grid 100. Therefore, as illustrated in FIG. 1, the current sensor 30 is disposed at a position to detect the portion of the power supplied by the power supply apparatuses 10A to 10C that flows to the grid 100 after being supplied to the load 200. In other words, in this embodiment, the current sensor 30 detects the current flowing between the grid 100 and the power supply apparatuses, i.e. the power supply apparatus 10A and the other power supply apparatus(es) (10B and/or 10C) connected to the power supply apparatus 10A. The power supply apparatuses 10A to 10C are notified directly or indirectly, by wired or wireless communication, of the current detected by the current sensor 30. The power supply apparatuses 10A to 10C can calculate the reverse flowing power from the current detected by the current sensor 30 and from each AC voltage supplied.

In the power supply system 1 according to this embodiment, as illustrated in FIG. 1, the power supply apparatus 10A and the power supply apparatus 10B are connected by a communication line 42. Furthermore, the power supply apparatus 10B and the power supply apparatus 10C are connected by a communication line 44. Such a connection may be wired or wireless. By the connection lines 22 and 24, the power supply apparatuses 10A to 10C in the power supply system 1 can each communicate with the other power supply apparatuses.

In this way, the power supply system 1 is configured to include a plurality of power supply apparatuses 10A to 10C that link to the grid 100 and convert power to supply to the load 200 from DC to AC, and a plurality of distributed power sources 20A to 20C respectively connected to the power supply apparatuses 10A to 10C. The power supply system 1 may also be configured to include the current sensor 30 that detects the current flowing between the plurality of power supply apparatuses 10A to 10C and the grid 100.

Next, the power supply apparatuses 10A to 10C according to this embodiment are described in greater detail.

Figure 2:
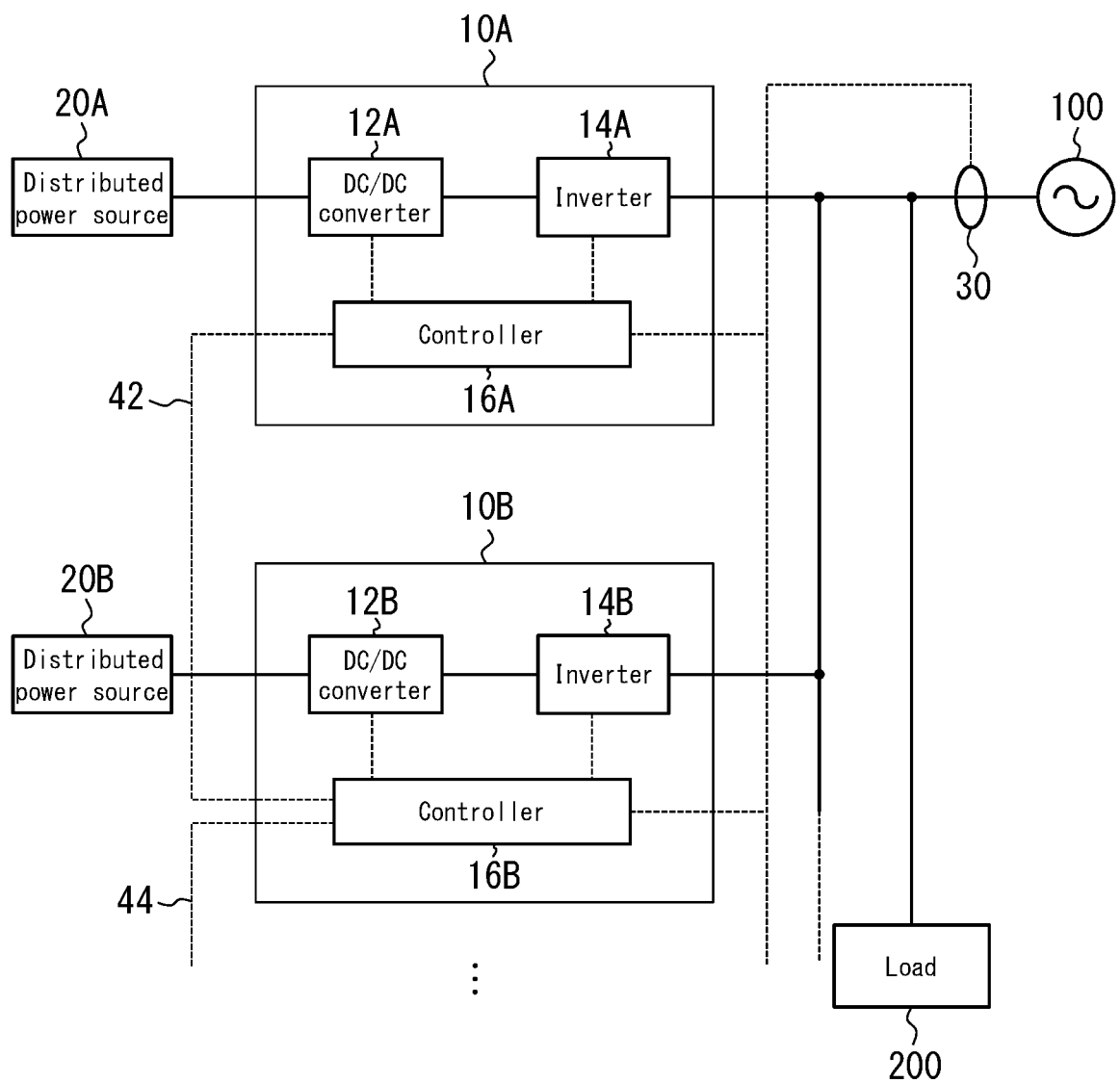
FIG. 2 is a functional block diagram illustrating the power supply apparatus according to one of the disclosed embodiments in greater detail.

As illustrated in FIG. 2, the power supply apparatus 10A is provided with a DC/DC converter 12A, an inverter 14A, and a controller 16A. The power supply apparatuses 10B and 10C may have a configuration similar to that of the power supply apparatus 10A. Therefore, the following focuses on the power supply apparatus 10A, with a description of the power supply apparatuses 10B and 10C being omitted as appropriate. As illustrated in FIG. 2, the power supply apparatus 10B is described as being provided with a controller 16B. Similarly, the power supply apparatus 10C is provided with a controller 16C.

The DC/DC converter 12A performs adjustments such as stepping up or stepping down the DC power output from the distributed power source 20A. The inverter 14A converts the DC power, the voltage of which was adjusted by the DC/DC converter 12A, to AC power. The DC/DC converter 12A and the inverter 14A may have a typical, widely-known structure. Hence, details are omitted.

The controller 16A controls and manages the power supply apparatus 10A overall, starting with the functional components of the power supply apparatus 10A. The controller 16A may, for example, be configured by a microcomputer, a processor (CPU), or the like. The controller 16A is described below as being provided with a memory that stores a variety of programs and a variety of information. This memory also stores algorithms, a variety of reference tables such as lookup tables (LUT), and the like that are used for data analysis, various calculations, and the like performed by the controller 16A.

In particular, in this embodiment, the controller 16A can control the current of AC power supplied from the power supply apparatus 10A by controlling the voltage of DC power input from the distributed power source 20A. In order to perform this control, the controller 16A is connected by control lines to the DC/DC converter 12A and the inverter 14A, as illustrated in FIG. 2. The following focuses on operations of the controller 16A and the like pertaining to control that is unique to this embodiment.

As illustrated in FIG. 2, when the current sensor 30 is connected to the power supply apparatus 10A, the current sensor 30 is preferably connected to the controller 16A. Also, when the current sensor 30 is connected to the power supply apparatus 10B and the power supply apparatus 10C, the current sensor 30 is preferably connected to the controllers of each of these apparatuses. With such connections, the controllers 16A to 16C can each control the DC power output from the distributed power sources 20A to 20C that are connected to the power supply apparatuses 10A to 10C in accordance with the current flowing between the power supply apparatuses 10A to 10C and the grid 100.

Furthermore, as illustrated in FIG. 2, the communication line 42 that connects the power supply apparatus 10A and the power supply apparatus 10B preferably connects the controller 16A and the controller 16B. Similarly, the communication line 44 that connects the power supply apparatus 10B and the power supply apparatus 10C preferably connects the controllers of these apparatuses. With such connections, the power supply apparatuses 10A to 10C can communicate with each other.

Next, the operations of the power supply apparatuses 10A to 10C according to this embodiment are described.

In this embodiment, in order to prevent the power supplied by the power supply system 1 from flowing in reverse to the grid 100, the current flowing between the power supply system 1 and the grid 100 is monitored, and preferably before reverse power flow occurs, the power supplied to the load 200 by the power supply system 1 is suppressed. By performing this type of control, the power supply apparatuses 10A to 10C adjust their power supply by controlling the input voltage from the distributed power sources 20A to 20C in accordance with the reverse flowing power or forward flowing power calculated by each of the power supply apparatuses 10A to 10C.

Figure 3:
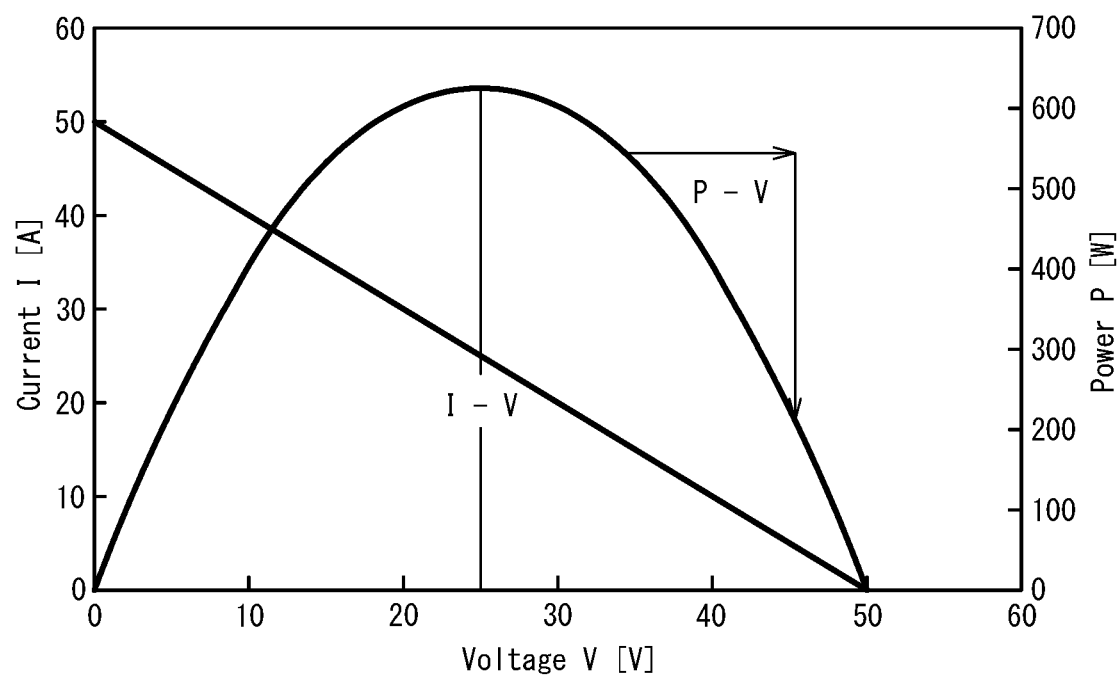
FIG. 3 is a graph illustrating information such as the correlation between voltage and current in the power supply apparatus according to one of the disclosed embodiments.

FIG. 3 illustrates voltage/current characteristics and voltage/power characteristics in the power supply apparatuses 10A to 10C. As an example, the following describes the power supply apparatus 10A.

In the power supply apparatus 10A, the controller 16A can adjust the power supplied from the power supply apparatus 10A by controlling the input voltage of DC power output from the distributed power source 20A that is connected to the power supply apparatus 10A.

For example, when the distributed power source 20A is a fuel cell, the characteristics of voltage and current of the input power (I-V characteristics) follow the relationship in Equation (1) below, since the internal resistance (R) is constant, and are represented by a straight line as illustrated in FIG. 3. As illustrated by the straight line for I-V characteristics in FIG. 3, the current I falls as the input voltage V is raised.

$$I=(\text{open voltage})/R-V/R \qquad \text{Equation (1)}$$

Here, the open voltage is the voltage when the load is zero.

Accordingly, in the power supply apparatus 10A, the characteristics (P-V characteristics) of the input voltage V and the output power P follow the relationship in Equation (2) below and are a quadratic curve as illustrated in FIG. 3.

$$P=VI=V\times(\text{open voltage})/R-V^2/R \qquad \text{Equation (2)}$$

In Equation (2) above, the power P is maximized when the input voltage V=open voltage/2. In this embodiment, the power supply apparatus 10A is only operated with the input voltage V in a range greater than the open voltage/2. Therefore, in this range, the output power P falls as the input voltage V is raised, as illustrated in FIG. 3.

Accordingly, in this embodiment, when in accordance with the current detected by the current sensor 30 a change in state from forward flowing power to reverse flowing power is expected, the controller 16A raises the input voltage of the power output from the distributed power source 20A to lower the power supply. On the other hand, when in accordance with the current detected by the current sensor 30 an increase in the forward flowing power is expected, the controller 16A lowers the input voltage of the power output from the distributed power source 20A to increase the power supply. In this way, the controller 16A according to this embodiment controls the input voltage of DC power output from the distributed power source 20A connected to the power supply apparatus 10A in accordance with the current flowing between the power supply apparatus 10A and the grid 100.

Next, operations by the power supply apparatuses 10A to 10C according to this embodiment to set control standards are described.

The power supply apparatuses 10A to 10C according to this embodiment set standard values in advance of controlling the power supply in order to control power supplied by the power supply apparatuses 10A to 10C appropriately when operating so that power output from the distributed power sources 20A to 20C does not flow in reverse to the grid 100. Here, upon the power supply apparatuses 10A to 10C suppressing the power supply in unison when each determines that power is expected to flow in reverse, the power supplied by each of the power supply apparatuses 10A to 10C cannot be controlled appropriately, and the power supplied by the power supply system 1 as a whole may become unstable. Therefore, in this embodiment, the controllers 16A to 16C of the power supply apparatuses 10A to 10C set standard values of controlling the supplied power by communicating with each other via the communication lines 42 and 44. Here, each of the controllers 16A to 16O of the power supply apparatuses 10A to 10C sets different standard values from the other power supply apparatuses.

Figure 4:
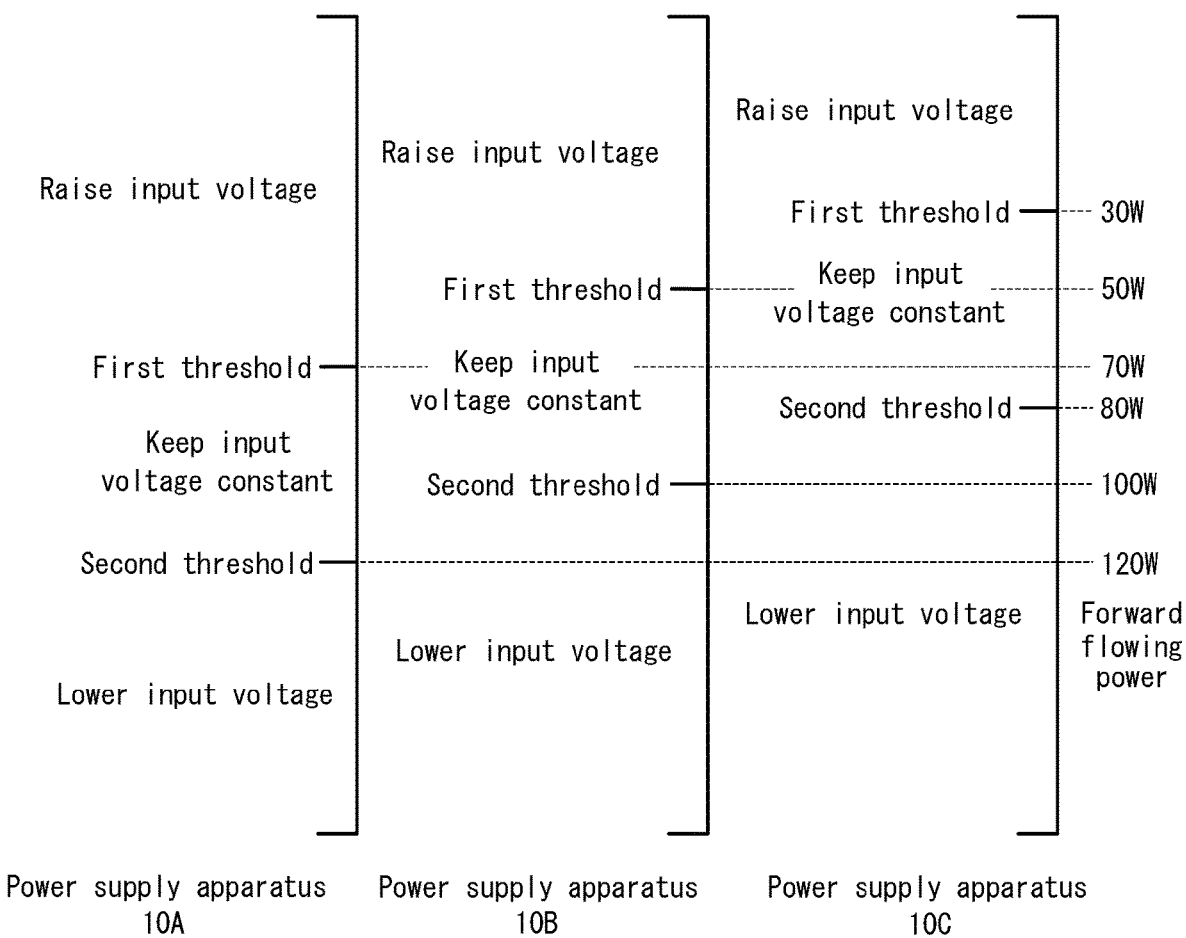
FIG. 4 is a conceptual diagram illustrating control of the power supply apparatus according to one of the disclosed embodiments.

FIG. 4 illustrates an example of the standards at the time of control for setting standard values in the power supply apparatuses 10A to 10C.

As illustrated in FIG. 4, in the power supply apparatuses 10A to 10C, the controllers 16A to 16C set standard values of controlling the input voltage of power output from the distributed power sources 20A to 20C in order to control power supplied by each of the power supply apparatuses 10A to 10C. The "standard values" set here may be thresholds of forward flowing (or reverse flowing) power, set as standard values of controlling the input voltage of power output from the distributed power sources 20A to 20C.

The right edge of FIG. 4 illustrates the forward flowing power calculated from the current detected by the current sensor 30. In the table in FIG. 4, the vertical axis represents an increase or decrease in forward flowing power. In other words, moving further up on the vertical axis represents a decrease in the forward flowing power (i.e. an increase in the reverse flowing power). Conversely, moving further down on the vertical axis represents an increase in the forward flowing power (i.e. a decrease in the reverse flowing power).

Here, in the controllers 16A to 16C, the forward flowing power or reverse flowing power can be calculated from the current detected by the current sensor 30 and the AC voltage supplied by each of the power supply apparatuses 10A to 10C. Based on the forward flowing power or reverse flowing power calculated in this way, the controllers 16A to 16C set the standard values of controlling the input voltage of power output from the distributed power sources 20A to 20C in order to adjust the power supplied by the power supply apparatuses 10A to 10C. At this time, while taking into account the above-described standard value of controlling the input voltage as set in the other power supply apparatuses 10A to 10C, the controllers 16A to 16C prevent the standard values that are set in the power supply apparatuses 10A to 10C from all being the same.

The power supply apparatuses 10A to 10C can communicate with each other by virtue of being connected to each other by the communication lines 42 and 44. As a result of such communication, a power supply apparatus (for example, 10A) can be determined to be a master apparatus, for example based on information such as the addresses allocated to the power supply apparatuses 10A to 10C. This master apparatus can set the above-described standard values of controlling the input voltage for all of the power supply apparatuses (10A to 10C) including the master apparatus itself. Hereinafter, the case of the power supply apparatus 10A being the master apparatus is described.

In the example illustrated in FIG. 4, the controller 16A sets 120 W as a second threshold for reducing the input voltage and increasing the power supply in the power supply apparatus 10A until the forward flowing power drops to 120 W. Then, the controller 16A sets a first threshold to 70 W for making the input voltage constant and maintaining the power supply in the power supply apparatus 10A when the forward flowing power is 120 W to 70 W. Then, the controller 16A is set to raise the input voltage and decrease the power supply in the power supply apparatus 10A when the forward flowing power is 70 W or less.

In the example illustrated in FIG. 4, the controller 16A sets 100 W as a second threshold for reducing the input voltage and increasing the power supply in the power supply apparatus 10B until the forward flowing power drops to 100 W. Then, the controller 16A sets a first threshold to 50 W for making the input voltage constant and maintaining the power supply in the power supply apparatus 10B when the forward flowing power is 100 W to 50 W. Then, the controller 16A is set to raise the input voltage and decrease the power supply in the power supply apparatus 10B when the forward flowing power is 50 W or less.

Furthermore, in the example illustrated in FIG. 4, the controller 16A sets 80 W as a second threshold for reducing the input voltage and increasing the power supply in the power supply apparatus 10C until the forward flowing power drops to 80 W. Then, the controller 16A sets a first threshold to 30 W for making the input voltage constant and maintaining the power supply in the power supply apparatus 10C when the forward flowing power is 80 W to 30 W. Then, the controller 16A is set to raise the input voltage and decrease the power supply in the power supply apparatus 10C when the forward flowing power is 30 W or less.

In this way, in this embodiment, the occurrence of reverse power flow can be prevented by shifting the timing for suppressing the power supplied by each power supply apparatus. With such a setting, in the example illustrated in FIG. 4, the forward flowing power can be maintained from 30 W to 120 W, i.e. the reverse flowing power can be maintained from −30 W to −120 W. The power supplied by each power supply apparatus varies with such a setting, but if uniform power supply is desired, the power supply can be adjusted when reverse flowing power is stable.

In the power supply system 1 according to this embodiment, the power supply apparatuses 10A to 10C preferably set the above-described control standards before starting power supply operations. In the example illustrated in FIG. 4, settings are made so that as the forward flowing power decreases (i.e. as the reverse flowing power increases), the power supply apparatus 10A suppresses the supplied power first, the power supply apparatus 10B suppresses the supplied power next, and the power supply apparatus 10C suppresses the supplied power last. Accordingly, during operation of the power supply system 1, when the forward flowing power becomes 120 W or greater (when the reverse flowing power becoming −120 W or less), the power supply apparatuses 10A to 10C each increase the supplied power by lowering the input voltage.

Subsequently, upon the forward flowing power becoming 120 W or less (the reverse flowing power becoming −120 W or more) for example by the power consumption of the load 200 dropping, the power supply apparatus 10A suspends the increase in supplied power by making the input voltage constant. At this time, the power supply apparatuses 10B and 10C each continue to increase the supplied power by lowering the input voltage. Subsequently, upon the forward flowing power becoming 100 W or less (the reverse flowing power becoming −100 W or more) for example by the power consumption of the load 200 dropping further, the power supply apparatuses 10A and 10B each suspend the increase in supplied power by making the input voltage constant. At this time, the power supply apparatus 10C continues to increase the supplied power by lowering the input voltage.

Subsequently, upon the forward flowing power becoming 80 W or less (the reverse flowing power becoming −80 W or more) for example by the power consumption of the load 200 dropping further, the power supply apparatuses 10A to 10C each suspend the increase in supplied power by making the input voltage constant.

Subsequently, upon the forward flowing power becoming 70 W or less (the reverse flowing power becoming −70 W or more) for example by the power consumption of the load 200 dropping further, the power supply apparatus 10A decreases the supplied power by raising the input voltage. At this time, the power supply apparatuses 10B and 10C each maintain the supplied power by making the input voltage constant. Subsequently, upon the forward flowing power becoming 50 W or less (the reverse flowing power becoming −50 W or more) for example by the power consumption of the load 200 dropping further, the power supply apparatuses 10A and 10B each decrease the supplied power by raising the input voltage. At this time, the power supply apparatus 10C maintains the supplied power by making the input voltage constant.

Subsequently, upon the forward flowing power becoming 30 W or less (the reverse flowing power becoming −30 W or more) for example by the power consumption of the load 200 dropping further, the power supply apparatuses 10A to 10C each decrease the supplied power by raising the input voltage.

Figure 5:
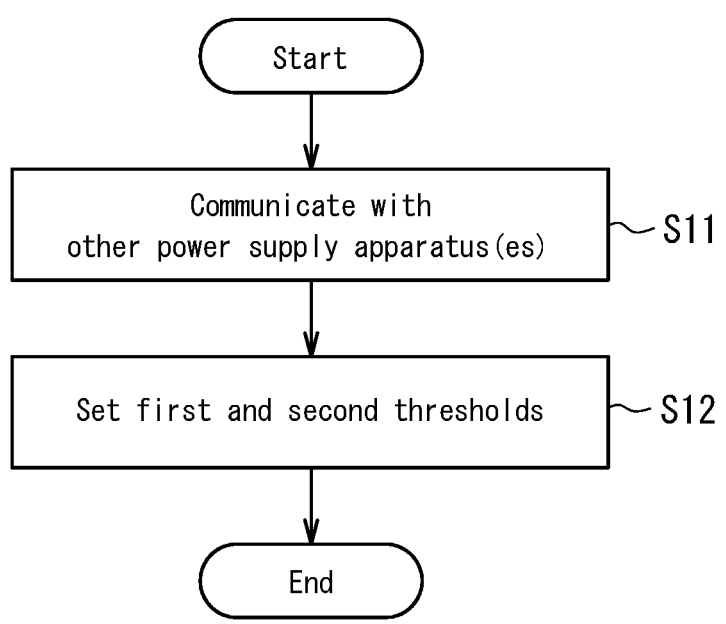
FIG. 5 is a flowchart illustrating operations for setting control standards in the power supply apparatus according to one of the disclosed embodiments.

FIG. 5 is a flowchart illustrating operations to set control standards in the power supply apparatuses 10A to 10C as described above.

At the start of the operations illustrated in FIG. 5, the controllers 16A to 16C of the power supply apparatuses 10A to 10C each communicate with the other power supply apparatuses 10A to 10C via the communication lines 42 and 44 (step S11). By the communication performed in step S11, as described above, the controllers 16A to 16C determine which one of the power supply apparatuses 10A to 10C will be the master apparatus. For example, upon determining that the power supply apparatus 10A will be the master apparatus, the controller 16A acquires various necessary information on the power supply apparatuses 10A to 10C by the communication in step S11. Here, the various necessary information may, for example, be information on various characteristics such as the voltage/current characteristics and the voltage/power characteristics in the power supply apparatuses 10A to 10C, as described in FIG. 3. Hereinafter, the power supply apparatus 10A is described as being determined to be the master apparatus.

Once predetermined communication takes place between the power supply apparatuses 10A to 10C in step S11, the controller 16A of the power supply apparatus 10A that is the master apparatus sets the above-described thresholds as the standard values of control on each of the power supply apparatuses 10A to 10C (step S12). Here, as described above, the controller 16A may set a first threshold as the standard value when raising the input voltage and a second threshold as the standard value when lowering the input voltage.

In this way, in this embodiment, the controller 16A controls the input voltage of DC power from the distributed power source 20A in accordance with the current flowing between the power supply apparatus 10A and the grid 100. Furthermore, the controller 16A sets standard values of controlling the input voltage based on communication with the other power supply apparatuses (10B, 10C) connected to the power supply apparatus 10A. Control by the controllers 16B and 16C on the other power supply apparatuses 10B and 10C may be configured similarly. In this embodiment, after setting the standard values of controlling the input voltage, the controllers 16A to 16C may control the input voltage of DC power output from the respective distributed power sources 20A to 20C connected to the power supply apparatuses 10A to 10C.

Here, the controller 16A of this embodiment preferably sets the thresholds as standard values when controlling the input voltage based on communication with the other power supply apparatuses (10B, 10C). In particular, based on communication with the other power supply apparatuses (10B, 10C), the controller 16A may set at least one of a (first) threshold as a standard value when raising the input voltage and a (second) threshold as a standard value when lowering the input voltage.

Also, based on communication with the other power supply apparatuses (10B, 10C), the controller 16A may set the thresholds as standard values when controlling the input voltage so as to differ from the thresholds set as standard values when controlling the input voltage on the other power supply apparatuses (10B, 10C). Similar operations may be performed on the respective controllers 16B and 16C of the power supply apparatuses 10B and 10C.

Figure 6:
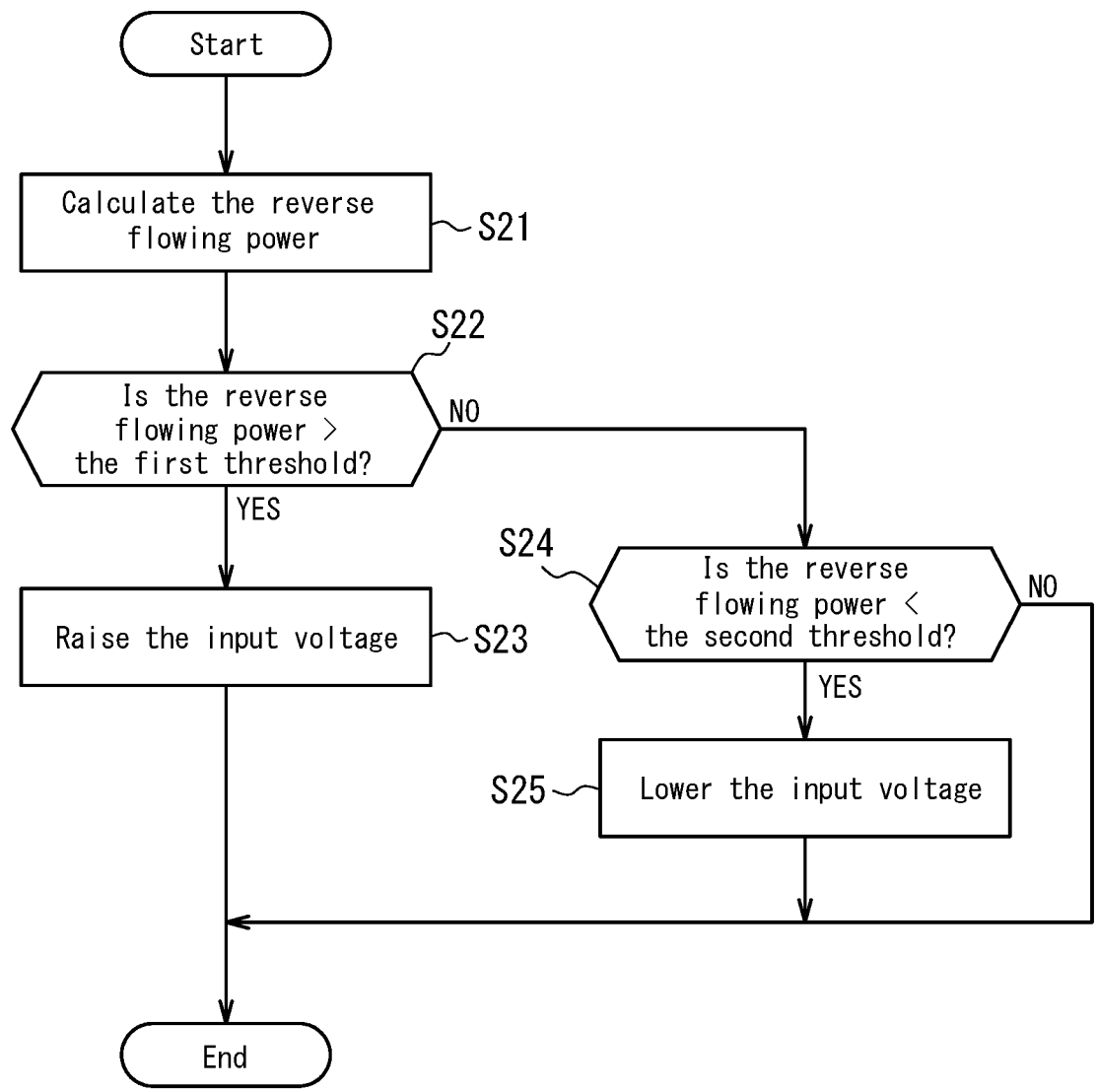
FIG. 6 is a flowchart illustrating operations for preventing reverse power flow of the power supply apparatus according to one of the disclosed embodiments.

FIG. 6 is a flowchart illustrating operations to control power supplied by the power supply apparatuses 10A to 10C in accordance with the control standards set as described above (FIG. 5). The following describes operations by the controller 16A in the power supply apparatus 10A, but the controllers 16B and 16C in the power supply apparatuses 10B and 10C can perform similar operations.

When the operations illustrated in FIG. 6 start, as described above, the controller 16A calculates the reverse flowing power from the current detected by the current sensor 30 and the supplied AC voltage (step S21).

Once the reverse flowing power is calculated in step S21, the controller 16A determines whether the calculated power is greater than the first threshold that has already been set (step S22). If the reverse flowing power is determined to be greater than the first threshold in step S22, the controller 16A raises the input voltage (step S23). As a result, the power supplied from the power supply apparatus 10A reduces.

On the other hand, if the reverse flowing power is determined not to be greater than the first threshold in step S22, the controller 16A determines whether the power is smaller than the second threshold that has already been set (step S24). If the reverse flowing power is determined to be smaller than the second threshold in step S24, the controller 16A lowers the input voltage (step S25). As a result, the power supplied from the power supply apparatus 10A increases. If the reverse flowing power is determined not to be smaller than the second threshold in step S24, the controller 16A ends the operations illustrated in FIG. 6. As a result, the power supplied from the power supply apparatus 10A is maintained.

By always performing the above-described processing at predetermined time intervals, such as once every few milliseconds, control can be performed for more appropriate power supply. When raising or lowering the input voltage, the input voltage can be changed by a specified value determined in advance for example based on the characteristics of output power of the distributed power sources. When lowering the input voltage, however, the input voltage is preferably not lowered below the prescribed minimum voltage.

In this way, the power supply apparatuses 10A to 10C according to this embodiment can control power supplied by the power supply apparatuses 10A to 10C appropriately when operating so that power output from the plurality of distributed power sources does not flow in reverse to the grid. Also, with the power supply apparatuses according to this embodiment, a plurality of power supply apparatuses are prevented from suppressing power simultaneously when operating to prevent reverse power flow. Hence, the variation in power can be stabilized. Furthermore, depending on the setting of the thresholds for power control, one of a plurality of power supply apparatuses can be chosen to supply power preferentially.

If a plurality of power supply apparatuses simultaneously suppress power when the occurrence of reverse power flow is expected, as in a conventional power conditioner, then the power may become unstable. To address this issue, one approach could be to control the supply of power to prevent reverse power flow by always having the plurality of power supply apparatuses communicate. By performing such control, however, the power supply apparatuses always need to communicate, which runs the risk of increasing communication traffic. In the case of the power supply apparatuses (power conditioners) handling a large amount of power, communication between the apparatuses during operations for power control may be affected by the surrounding electromagnetic noise, increasing the likelihood of an error in the communicated signal. Therefore, it is envisioned that the communication between apparatuses cannot be performed at high speed. In this case, if communication is always performed at a slow speed, and communication traffic increases, there is a risk that an instantaneous occurrence of reverse power flow cannot be prevented. Also, with such communication, the processing load of the controller increases in order to transmit and receive various data and to process the received data.

According to the power supply apparatus of this embodiment, however, the occurrence of reverse power flow can be prevented by simply executing processing to shift the thresholds set for power control. Therefore, according to the power supply apparatus of this embodiment, during operation to prevent the power generated by a plurality of distributed power sources from flowing in reverse, the power generated by each of the distributed power sources can be appropriately adjusted without communication control between the distributed power sources. Therefore, according to the power supply apparatus of this embodiment, the processing load of the controller experiences nearly no change.

Although this disclosure is based on the accompanying drawings and examples, it is to be noted that various changes and modifications will be apparent to those skilled in the art based on this disclosure. Therefore, such changes and modifications are to be understood as included within the scope of this disclosure. For example, the functions and the like included in the various functional components, means, and steps may be reordered in any logically consistent way. Furthermore, functional components or steps may be combined into one or divided. The above embodiments of this disclosure are not limited to being implemented precisely as described and may be implemented by combining or partially omitting the features thereof.

For example, when setting the thresholds for power control performed by the power supply apparatuses, the raising or lowering of the input voltage may be provided with hysteresis, and the first and/or second threshold may be set to move up and down depending on whether the reverse power flow is increasing or decreasing.

Also, to prepare for detection of reverse flowing power exceeding the first threshold, an additional threshold greater than the first threshold illustrated in FIG. 4 may be set. In this case, when the reverse flowing power exceeds the additional threshold that is greater than the first threshold, the input voltage may be raised at a relatively high rate.

When the power supply apparatuses start operations for power control, the standard values (thresholds) of performing the power control need not be set to the same values every time and may instead be set to different values each time, based on the conditions of the power supply apparatuses and/or the distributed power sources at that time. For example, when power is supplied preferentially by one of the power supply apparatuses, the standard values (thresholds) that are set may be changed at each setting based on conditions such as the magnitude of the total power supplied and/or the length of the total operating time.

This disclosure is not limited to the power supply apparatuses 10A to 10C and may also be implemented as a power supply system that includes a plurality of power supply apparatuses like the power supply apparatuses 10A to 10C. In this case, in the system, at least one power supply apparatus among the plurality of power supply apparatuses 10A to 10C controls the input voltage of DC power output from the distributed power source connected to the at least one power supply apparatus in accordance with current detected by the current sensor 30. Furthermore, the at least one power supply apparatus sets standard values of controlling the input voltage based on communication with the other power supply apparatuses connected to the at least one power supply apparatus.

Furthermore, this disclosure may be implemented as a power supply method in a power supply system such as the one described above. The steps performed by at least one power supply apparatus among the plurality of power supply apparatuses 10A to 10C may include steps such as the following.

A power supply method according to the disclosed embodiments may include:
communicating with another power supply apparatus connected to the at least one power supply apparatus;
detecting current flowing between the plurality of power supply apparatuses and the grid;
controlling input voltage of the DC power from a distributed power source in accordance with the current detected in the detecting step; and
setting, based on communication in the communicating step, a standard value of controlling the input voltage.

The power supply apparatus according to the above embodiment has been described as controlling the input "voltage" of DC power output from the distributed power source, but the power supply apparatus may instead control the input "current" of DC power output from the distributed power source.

Much of the subject matter of this disclosure is described as a series of operations executed by a computer system and other hardware that can execute program instructions. Examples of the computer system and other hardware include a general-purpose computer, a Personal Computer (PC), a dedicated computer, a workstation, a Personal Communications System (PCS), an electronic notepad, a laptop computer, and other programmable data processing apparatuses. It should be noted that in each embodiment, various operations are executed by a dedicated circuit (for example, individual logical gates interconnected in order to execute a particular function) implemented by program instructions (software), or by a logical block, program module, or the like executed by one or more processors. The one or more processors that execute a logical block, program module, or the like are, for example, one or more of each of the following: a microprocessor, a central processing unit (CPU), an Application Specific Integrated Circuit (ASIC), a Digital Signal Processor (DSP), a Programmable Logic Device (PLD), a Field Programmable Gate Array (FPGA), a controller, a microcontroller, an electronic device, another apparatus designed to be capable of executing the functions disclosed here, and/or a combination of any of the above. The embodiments disclosed herein are, for example, implemented by hardware, software, firmware, middleware, microcode, or a combination of any of these.

The machine-readable, non-transitory storage medium used here may also be configured by a computer-readable, tangible carrier (medium) in the categories of solid-state memory, magnetic disks, and optical discs. These media store data structures and an appropriate set of computer instructions, such as program modules, for causing a processor to execute the techniques disclosed herein. Examples of computer-readable media include an electrical connection with one or more wires, a magnetic disk storage medium, or other magnetic or optical storage medium (such as a Compact Disc (CD), Digital Versatile Disc (DVD®), and Blu-ray Disc® (DVD and Blu-ray disc are each a registered trademark in Japan, other countries, or both)), portable computer disk, Random Access Memory (RAM), Read-Only Memory (ROM), rewritable programmable ROM such as EPROM, EEPROM, or flash memory, another tangible storage medium that can store information, or a combination of any of these. The memory may be provided internal and/or external to a processor/processing unit. As used in this disclosure, the term "memory" refers to all types of long-term storage, short-term storage, volatile, non-volatile, or other memory. No limitation is placed on the particular type or number of memories, or on the type of medium for memory storage.

REFERENCE SIGNS LIST

1 Power supply system
10A, 10B, 10C Power supply apparatus
12A, 12B DC/DC converter
14A, 14B Inverter
16A, 16B Controller
20A, 20B, 20C Distributed power source
30 Current sensor
42, 44 Communication line
100 Grid
200 Load

The invention claimed is:

1. A power supply apparatus configured to link to a grid and convert DC power from a distributed power source to AC power, the power supply apparatus comprising:
a controller configured to control input voltage of the DC power in accordance with current flowing between the power supply apparatus and the grid;
wherein based on communication with another power supply apparatus connected to the power supply apparatus, the controller sets a threshold of controlling the input voltage as a threshold of forward flowing power or reverse flowing power.

2. The power supply apparatus of claim 1, wherein based on communication with the other power supply apparatus, the controller sets the threshold controlling the input voltage.

3. The power supply apparatus of claim 2, wherein based on communication with the other power supply apparatus, the controller sets at least one of a threshold of raising the input voltage and a threshold of lowering the input voltage.

4. The power supply apparatus of claim 2, wherein based on communication with the other power supply apparatus, the controller sets a threshold of controlling the input voltage so as to differ from a threshold set of controlling input voltage on the other power supply apparatus.

5. The power supply apparatus of claim 1, wherein after setting the threshold of controlling the input voltage, the controller controls input voltage of DC power output from a distributed power source connected to the power supply apparatus.

6. A power supply system comprising:
a plurality of distributed power sources;
a plurality of power supply apparatuses respectively connected to the plurality of distributed power sources, and each configured to link to a grid and convert DC power from the distributed power source to AC power; and a current sensor configured to detect current flowing between the plurality of power supply apparatuses and the grid;

wherein at least one power supply apparatus among the plurality of power supply apparatuses controls input voltage of the DC power in accordance with current detected by the current sensor, and based on communication with another power supply apparatus connected to the at least one power supply apparatus, sets a threshold of controlling the input voltage as a threshold of forward flowing power or reverse flowing power.

7. The power supply system of claim 6, wherein based on communication with the other power supply apparatus, the at least one power supply apparatus sets the threshold of controlling the input voltage.

8. The power supply system of claim 7, wherein based on communication with the other power supply apparatus, the at least one power supply apparatus sets at least one of a threshold of raising the input voltage and a threshold of lowering the input voltage.

9. The power supply system of claim 7, wherein based on communication with the other power supply apparatus, the at least one power supply apparatus sets a threshold of controlling the input voltage so as to differ from a threshold set of controlling input voltage on the other power supply apparatus.

10. The power supply system of claim 6, wherein after setting the threshold of controlling the input voltage, the at least one power supply apparatus controls input voltage of DC power output from a distributed power source connected to the power supply apparatus.

11. A power supply method in a power supply system, the power supply system comprising:

a plurality of distributed power sources; and a plurality of power supply apparatuses respectively connected to the plurality of distributed power sources, and each configured to link to a grid and convert DC power from the distributed power source to AC power;

the power supply method comprising steps performed by at least one power supply apparatus among the plurality of power supply apparatuses, the steps comprising:

communicating with another power supply apparatus connected to the at least one power supply apparatus;

detecting current flowing between the plurality of power supply apparatuses and the grid;

controlling input voltage of the DC power in accordance with the current detected in the detecting step; and setting, based on communication in the communicating step, a threshold of controlling the input voltage as a threshold of forward flowing power or reverse flowing power.

12. The power supply method of claim 11, wherein in the setting step, based on communication with the other power supply apparatus, the at least one power supply apparatus sets the threshold of controlling the input voltage.

13. The power supply method of claim 12, wherein in the setting step, based on communication with the other power supply apparatus, the at least one power supply apparatus sets at least one of a threshold of raising the input voltage and a threshold of lowering the input voltage.

14. The power supply method of claim 12, wherein in the setting step, based on communication with the other power supply apparatus, the at least one power supply apparatus sets a threshold of controlling the input voltage so as to differ from a threshold set of controlling input voltage on the other power supply apparatus.

15. The power supply method of claim 11, wherein after setting, in the setting step, the threshold of controlling the input voltage, the at least one power supply apparatus controls, in the controlling step, input voltage of DC power output from a distributed power source connected to the power supply apparatus.

* * * * *